US010970121B2

(12) United States Patent
Devarakonda et al.

(10) Patent No.: US 10,970,121 B2
(45) Date of Patent: *Apr. 6, 2021

(54) WORKLOAD-TO-CLOUD MIGRATION ANALYSIS BASED ON CLOUD ASPECTS

(71) Applicant: INTERNATIONAL BUSINESS MACHINES CORPORATION, Armonk, NY (US)

(72) Inventors: Murthy Devarakonda, Peekskill, NY (US); Keith C. Goodman, Bala Cynwyd, PA (US); Birgit M. Pfitzmann, Valhalla, NY (US); Shaya Potter, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/895,824

(22) Filed: Feb. 13, 2018

(65) Prior Publication Data

US 2018/0173566 A1 Jun. 21, 2018

Related U.S. Application Data

(63) Continuation of application No. 15/296,954, filed on Oct. 18, 2016, now Pat. No. 9,940,172, which is a
(Continued)

(51) Int. Cl.
*G06F 9/46* (2006.01)
*G06F 9/50* (2006.01)
(Continued)

(52) U.S. Cl.
CPC ............ *G06F 9/505* (2013.01); *G06F 9/4856* (2013.01); *G06F 9/5072* (2013.01); *G06Q 10/00* (2013.01)

(58) Field of Classification Search
CPC ...... G06F 9/505; G06F 9/4856; G06F 9/5072; G06Q 10/00
See application file for complete search history.

(56) References Cited

U.S. PATENT DOCUMENTS

2011/0099548 A1* 4/2011 Shen ................. G06F 9/45558 718/1

FOREIGN PATENT DOCUMENTS

EP 2251783 A1 11/2010

OTHER PUBLICATIONS http://www8.hp.com/us/en/solutions/solutions-detail.html. "Service for the Instant-On Enterprise" Oct. 2010, 4 pages.
(Continued)

*Primary Examiner* — Tammy E Lee
(74) *Attorney, Agent, or Firm* — Tutunjian & Bitetto, P.C.; Kurt Goudy

(57) ABSTRACT

Methods and systems for evaluating compatibility of a cloud of computers to perform one or more workload tasks. One or more computing solution aspects are determined that corresponding to one or more sets of workload factors, where the workload factors characterize one or more workloads, to characterize one or more computing solutions. The workload factors are compared to the computing solution aspects in a rule-based system to exclude computing solutions that cannot satisfy the workload factors. A computing solution is selected that has aspects that accommodate all of the workload factors to find a solution that accommodates the one or more individual workloads.

20 Claims, 10 Drawing Sheets

Related U.S. Application Data continuation of application No. 13/114,679, filed on May 24, 2011, now Pat. No. 9,495,649.

(51) Int. Cl.
*G06Q 10/00* (2012.01)
*G06F 9/48* (2006.01)

(56) References Cited

OTHER PUBLICATIONS http://calculator.s3.amazonaws.com/calc5.html "Amazon Web Services Simple Monthly Calculator", Oct. 2007, 1 page.
http://www.astadia.com/itx_us/Astadia, "The Cloud Computing Connection", Aug. 2010, 1 page.
http://soa-biz.blogspot.com/2009/11/workload-analysis-in-cloud-computing.html. "Workload Analysis in Cloud Computing", Nov. 2009, 7 pages.
Chen, Y., et al., "Towards Understanding Cloud Performance Tradeoffs Using Statistical Workload Analysis and Replay", Technical Report No. USC/EECS-2010-81, May 2010, 14 pages.
http://www.novell.com/communities/node/8245, "PlateSpin Recon: Workload Analysis Flyer and Presentation", May 2009, 2 pages.
http://www.rtda.com/univa-expands-cloud-management-capabilities-planning-and-analytics-product, Univa Expands Cloud Management Capabilities with Planning and Analytics Products, Jul. 2009, 2 pages.

* cited by examiner

| image_name | cloud | os_name | os_bits | os_version | procs | mem_GB | disk_GB | tier | isolation | countries | SOX | HIPAA | Change_Window |
|---|---|---|---|---|---|---|---|---|---|---|---|---|---|
| compare | | str_== | == | >= | >= | >= | >= | <= | >= | CONTAINS | str_== | str_== | window_<= |
| fail | | 1 | 1 | 1 | 0 | 0 | 0 | 0 | 0 | 0 | 0 | 0 | 0 |
| Bronze_32 | C1 | RH5 | 32 | 5.4 | 1 | 2 | 175 | 4 | 0 | US, Canada, Mexico | no | no | Fr6pm-Mo9am |
| Silver_32 | C1 | RH5 | 32 | 5.4 | 2 | 4 | 350 | 4 | 0 | US, Canada, Mexico | no | no | Fr6pm-Mo9am |
| Gold_32 | C1 | RH5 | 32 | 5.4 | 4 | 4 | 350 | 4 | 0 | US, Canada, Mexico | no | no | Fr6pm-Mo9am |
| Bronze_64 | C1 | RH5 | 64 | 5.4 | 2 | 4 | 850 | 4 | 0 | US, Canada, Mexico | no | no | Fr6pm-Mo9am |
| Silver_64 | C1 | RH5 | 64 | 5.4 | 4 | 8 | 1024 | 4 | 0 | US, Canada, Mexico | no | no | Fr6pm-Mo9am |
| Gold_64 | C1 | RH5 | 64 | 5.4 | 8 | 16 | 1024 | 4 | 0 | US, Canada, Mexico | no | no | Fr6pm-Mo9am |
| Platinum_64 | C1 | RH5 | 64 | 5.4 | 16 | 16 | 2048 | 4 | 0 | US, Canada, Mexico | no | no | Fr9pm-Su9pm |
| Small | C2 | RH5 | 64 | 5.4 | 2 | 4 | 100 | 3 | 1 | Switzerland | yes | no | Sa2am-Su3pm |
| Medium | C2 | RH5 | 64 | 5.4 | 4 | 8 | 400 | 3 | 1 | Switzerland | yes | no | Sa2am-Su3pm |
| Large | C2 | RH5 | 64 | 5.4 | 8 | 16 | 800 | 3 | 1 | Switzerland | yes | no | Sa2am-Su3pm |

FIG. 11

WORKLOAD-TO-CLOUD MIGRATION ANALYSIS BASED ON CLOUD ASPECTS

BACKGROUND

Technical Field

The present invention relates to cloud computing and, in particular, to methods and systems based on cloud aspects to facilitate migration of workloads to cloud computing environments.

Description of the Related Art

Many enterprises are considering the migration of existing workloads to a cloud or considering whether a new workload would be more effectively deployed on a cloud than on a conventional system. Factors that face such enterprises include whether to run one specific workload on one specific cloud; cost comparisons of running the workload on several potential clouds, such as two available public clouds or a to-be-built private cloud of the customer; comparing the costs with the current cost of running the workload; and an overall strategy for placing a large set of workloads on one or more clouds, including the planning of the most suitable design for a private cloud.

Existing migration analysis tools are based primarily on application-to-operating-system compatibility. This is not sufficient for a cloud analysis, because with clouds there are many other factors to consider. Clouds mostly gain their efficiency by economies of scale, and so each cloud fixes the features it offers and can accommodate. There are many more possible cloud configurations than operating system (OS) and hardware platforms, especially if one is designing a private cloud.

SUMMARY

A method is shown that includes determining one or more computing solution aspects corresponding to one or more sets of workload factors, where the workload factors characterize one or more workloads, to characterize one or more computing solutions; comparing the workload factors to the computing solution aspects using a processor in a rule-based system to exclude computing solutions that cannot satisfy the workload factors; and selecting a computing solution having aspects that accommodate all of the workload factors to find a solution that accommodates the one or more individual workloads.

A method is shown that includes determining computing solution aspects using a processor to accommodate a set of workload factors that characterize one or more workloads, determining a set of components for a computing solution that provide or exceed the determined computing solution aspects according to a rule based system, selecting components from the determined set of components that optimize cost, and generating a computing solution design that uses the selected components such that the computing solution is compatible with the one or more workloads.

A system for evaluating compatibility of a computing solution to perform one or more workload tasks is shown that includes an aspect database configured to determine one or more computing solution aspects corresponding to one or more sets of workload factors, where the workload factors characterize one or more workloads, to characterize one or more computing solutions; and a processing module configured to compare the workload factors to the computing solution aspects in a rule-based system to exclude computing solutions that cannot satisfy the workload factors and further configured to select a computing solution having aspects that accommodate all of the workload factors to find a solution that accommodates the one or more individual workloads.

A system for providing a private computing solution is shown that includes an aspect database configured to determine one or more computing solution aspects corresponding to one or more sets of workload factors, where the workload factors characterize one or more workloads, to characterize one or more computing solutions; a processing module configured to determine a set of components for a computing solution that provide or exceed the determined computing solution aspects according to a rule-based system, and further configured to select components from the determined set of components that optimize cost; and a report module configured to generate a computing solution design that uses the selected components such that the computing solution is compatible with the one or more workloads.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein:

FIG. 11 depicts compatibility rules according to an embodiment of the present invention.

DETAILED DESCRIPTION

Figure 1:
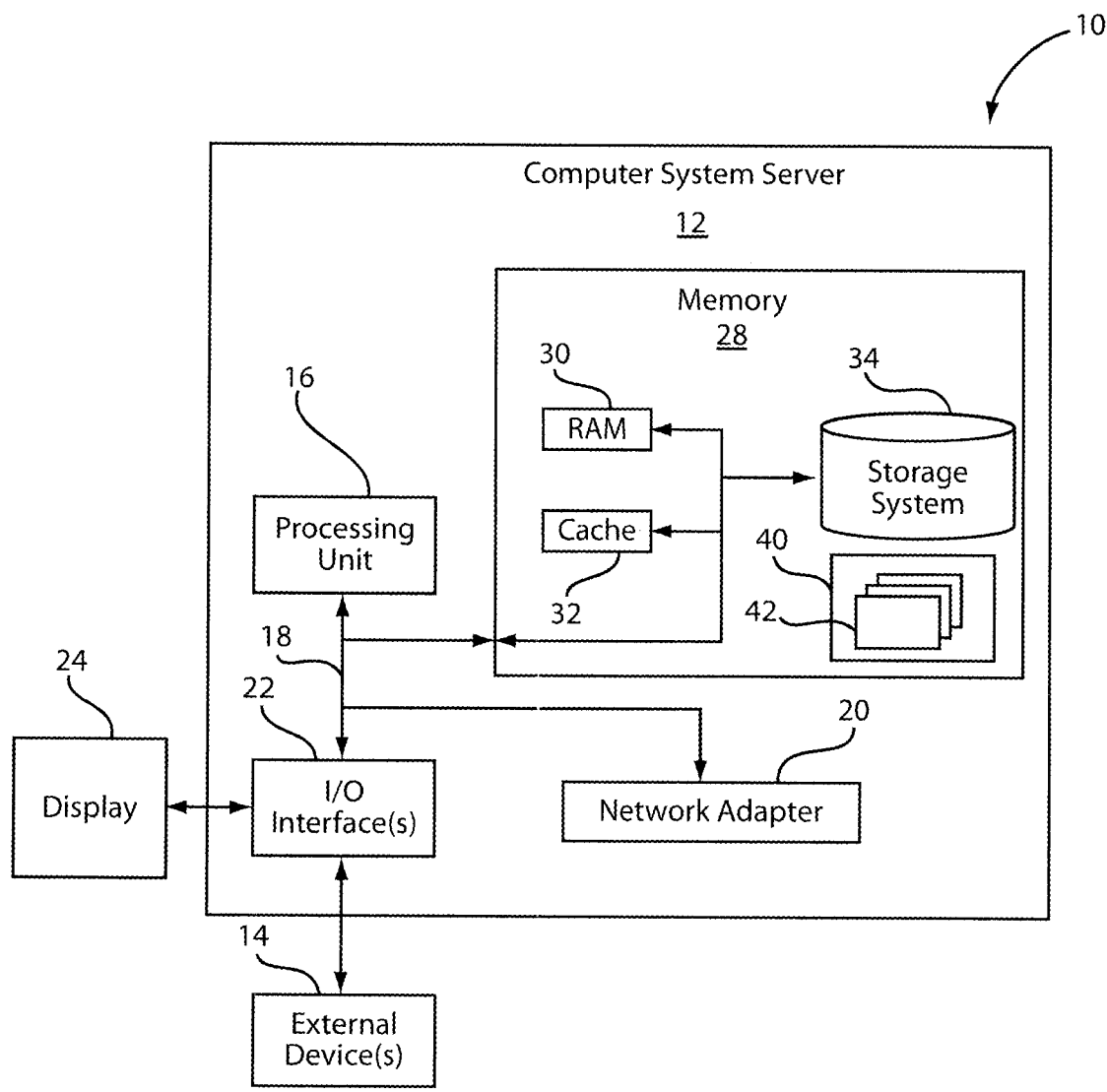
FIG. 1 depicts a computing node according to an embodiment of the present invention.

Existing tools for assessing cloud compatibility are largely qualitative suitability ranking tools, based at most on workload types (e.g., "web application," "on-line transaction processing," and "batch"). These tools do not use data about individual workloads (e.g., "a specific catalog display web application" or "a monthly travel statistics batch process") or servers. Consequently, they neither consider compatibility details nor precise costs. Other tools are quantitative, but merely address one of a few fixed clouds. Existing analysis tools do not actually do a compatibility analysis from existing workloads—they start with assumptions that a certain number of operating system (OS) images with certain sizes are to be moved to the given cloud.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Exemplary characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models may include:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may include:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
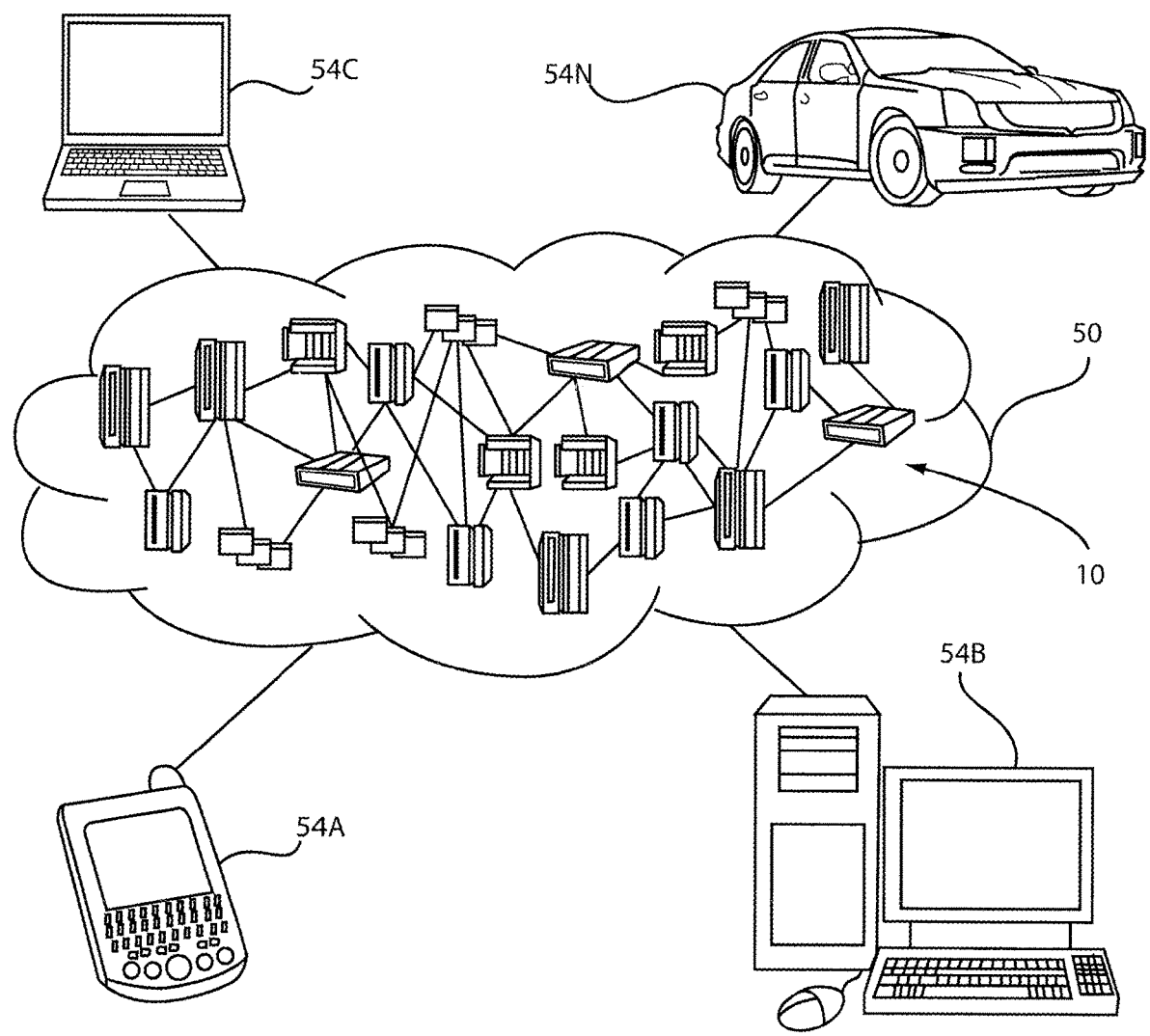
FIG. 2 depicts a computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
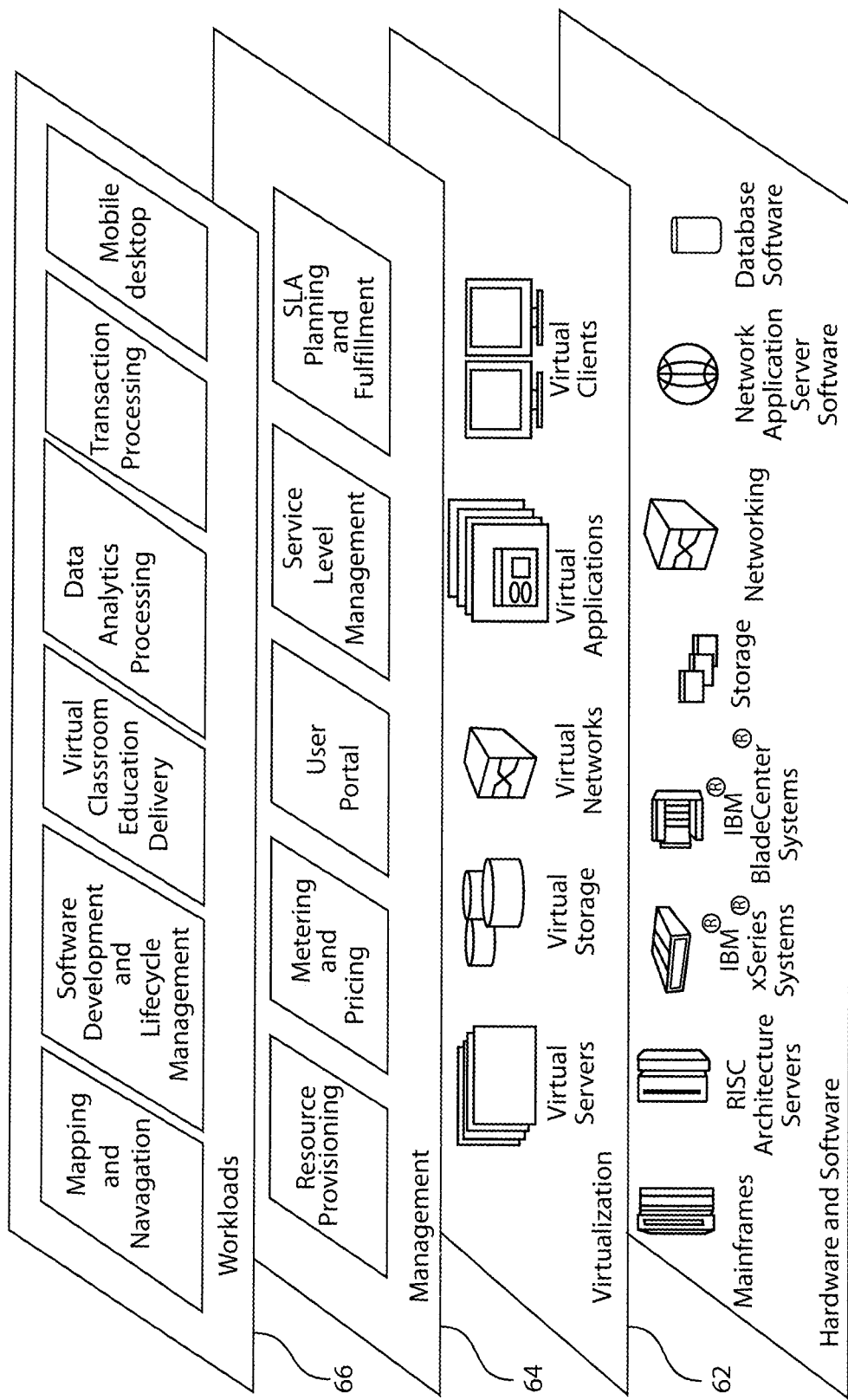
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, conventional procedural programming languages, such as the "C" programming language or similar programming languages, scripting languages such as Perl, and rule-based languages such as PROLOG or ILOG JRules. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). An optimizing solver may further be used.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, cloud, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
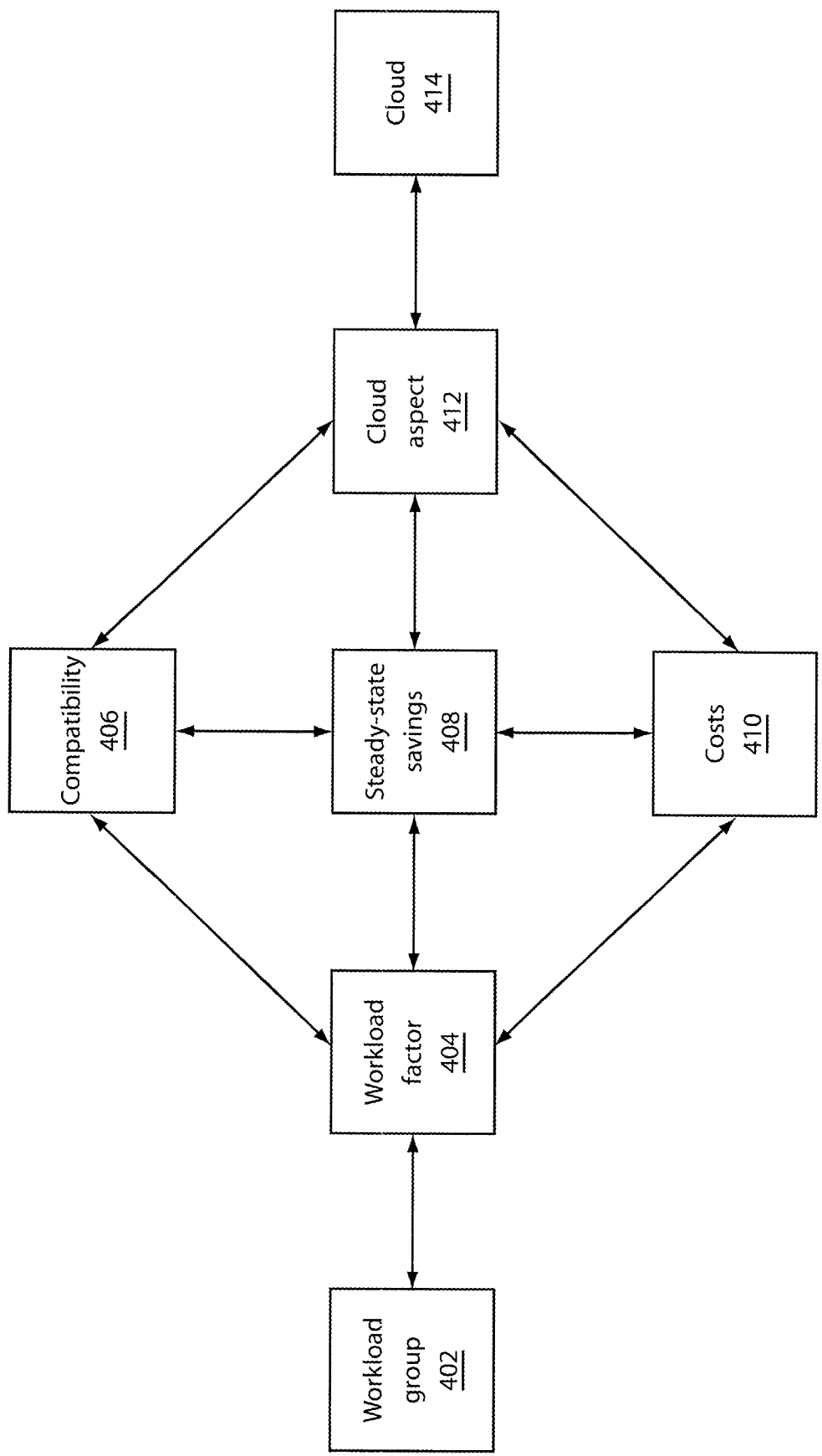
FIG. 4 depicts a block diagram of considerations in workload-to-cloud migration according to an embodiment of the present invention.

Referring now to FIG. 4, a block diagram of compatibility analysis is shown. Block 402 comprises one or more workloads. Such workloads may comprise, for example, an enterprise application or a small data center or hosting environment. For example a workload may be a collection of servers and/or software components on them that are to be migrated together. In the case of an enterprise application, the workload is tested as a whole, with the servers and software components in it interacting frequently, such that it is easier to have them close to each other.

Block 404 extracts workload factors that characterize the individual workloads and workload groups of block 402. Examples of workload factors include utilization fluctuation, current virtualization, quantity of custom code, stakeholders, and workload type. Workloads 402 often comprise multiple images. Using the present principles, workload-level and image-level factors may be taken into account in block 404. Workload factors may also include information regarding a working environment. For example, any given data center may have its own standards, costs, etc. Some factors influencing cloud migrations and achievable increases in economy of scale depend on such environments.

Block 414 meanwhile comprises one or more clouds or cloud-designs. It should be noted that, although clouds are specifically described herein, such descriptions are not meant to be limiting. It is contemplated that the present principles may be applied to any computer network or computing solution, e.g., a web hosting environment with certain IT management standards. The clouds 414 are characterized by aspects 412. Cloud aspects 412 are largely independent of each other and remain standardized across multiple clouds (in order to facilitate automated matching as described below). Exemplary aspects may include, e.g., whether OS standardization is offered and, if yes, to what OSes, infrastructure, virtualization, middleware standardization, SLAs offered, disaster recovery (DR) offered, security, and platform-as-a-service (PaaS) aspects, whether the cloud supports application stacking, whether it bills based on currently running images, what levels of availability the cloud offers to its customers, and what maintenance window it prescribes.

The cloud aspects 412 and the workload factors 404 are used to evaluate the matching between the workload group 402 and the clouds 414. This evaluation considers raw compatibility 406 (whether the cloud is capable of running the workload), potential steady-state savings 408, and migration costs 410. Further, matching may be performed against individual cloud images, as well as against a cloud as a whole. This allows for evaluation of source-image-to-cloud-image affinities as well as workload-to-cloud affinities, based on the underlying image affinities.

FIG. 4 above represents a root-cause model for why, or why not, certain workload groups 402 may fit with particular clouds 414, in other words what workload factors or cloud aspects lead to an incompatibility or to high migration costs. Workloads may comprise somewhat related servers and software—as the customer defines them. For example, if workloads correspond to enterprise applications, those enterprise applications may be defined in an asset-management system. Or workloads may be a specific old hosting environment or a small departmental data center. A benefit of the root-cause model is that cost model statistics made for other migrations may be reused for clouds, because many of the root causes that determine cloud savings also exist in isolation in other types of migration.

Figure 5:
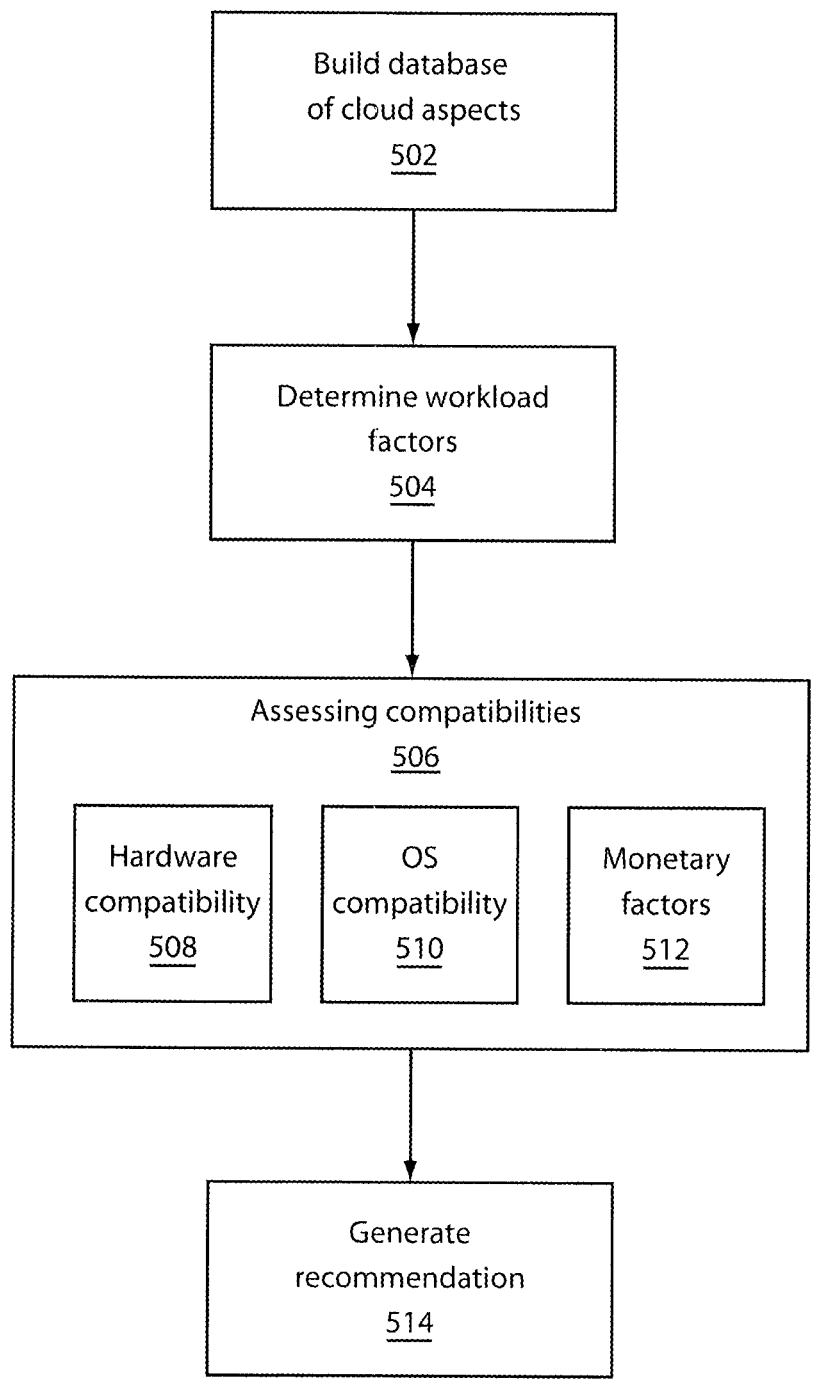
FIG. 5 depicts a block/flow diagram of creating a workload-to-cloud migration recommendation according to an embodiment of the present invention.

Referring now FIG. 5, a block/flow diagram of a method for matching workloads to a cloud is shown. Block 502 builds a database of cloud aspects that includes characteristics of pre-existing clouds as well as potential characteristics of yet-to-be-built private clouds. Block 504 determines factors of a workload or workloads proposed for migration. Block 506 assesses compatibilities by searching the database of cloud aspects for clouds that can accommodate the needs of the workload(s). Block 506 accomplishes this by searching the database, for example, for hardware compatibility 508 (e.g., CPU architecture), OS/software compatibility 510, fulfillment of resource needs, fulfillment of security requirements, acceptability of maintenance windows, and by evaluating monetary factors such as migration costs and steady-state savings 512. Block 512 may include a rule-based system that operates by considering whether given cloud aspects satisfy a set of rules defined by workload factors. An exemplary rule might require that the cloud offer a 32-bit OS. Another exemplary rule might require that the cloud offer at least 4 gigabytes of memory. Block 514 provides a recommendation to a user based on this assessment. The monetary factors 512 may include steady-state costs, such as software licenses and fixed monthly image costs, and may include migration costs, such as the cost of porting code from one platform to another.

In this way, rather than monolithically addressing particular clouds, or even clouds generally, building a database of cloud aspects in block 502 allows for flexibility in making migration recommendations 514. It is therefore easier to link individual cloud aspects 412 to certain individual workload factors 404 than to use a single cloud description. Even if the cost estimates for things such as code migration are incomplete or are incorrect, they may be factored in the same way into all of the cloud alternatives where such costs occur. This is due to the fact that costs are generally associated with particular cloud aspects (e.g., the cost of migrating to a particular operating system). Thus they will not bias strategy decisions. Furthermore, because some cloud aspects 412 may have been used in prior environments, existing statistics may be reused to evaluate the benefits and costs that arise from introducing such an aspect, even while overall costs of introducing certain clouds as a whole are not yet known. One example of such an aspect is virtualization, where previous experience with virtualization can help in decision making when considering clouds that feature virtualization as an aspect.

Table 1 below shows a list of exemplary workload factors 404. Table 2 below shows a list of exemplary cloud aspects 412. Each of the workload factors 404 shown in Table 1 may be associated with one or more cloud aspects, where the availability of particular cloud aspects in a given cloud has implications for the viability and/or cost of a workload.

TABLE 1

OS
Middleware and standard apps present
Infrastructure apps (this might be decided once for workload group)
Custom code (binary? language?)
Utilization (CPU, memory, disk, IO)
Locality of different parts of the application (servers, storage, clients)
Throughput promised in enterprise application SLA
(often a multi-image factor)
Response time promised in enterprise application SLA
(often a multi-image factor)
Current storage solution?

TABLE 1-continued

Current storage service level?
Current High Availability (HA) solution, if any?
Current HA service level?
    And is actual service much better?
Maintenance:
    Fixed windows?
    Any time?
    Only after agreement?
    Do patches themselves need agreement?
    Required patch speed?
Current DR solution, if any?
Current DR service level?
Multi-tenancy allowed?
Firewalls
Need for encrypting storage?
Is certain monitoring/reporting needed for overall enterprise dashboards?

TABLE 2

OS standardization (yes/no)
    If yes, OS versions offered
    Image sizes offered
    Application version standardization (yes/no)
    Full application standardization (yes/no)
    If yes, exact applications and versions supported
    Applications excluded
    Application stacking
    Infrastructure standardization
    Details on information technology infrastructure library processes and layers covered
    Performance guarantees
    Storage architecture
    Availability
    Hazard assessment
    DR
    Locality guarantee options in the cloud
    Maintenance for cloud-offered client systems
    SLA insight offered
    Separation/non-colocations
    Firewalls
    Encryption
    Security compliance
    Retainable hostname Workload factors 404 may be collected manually, through the use of a questionnaire, or may be acquired from existing enterprise databases (e.g., a configuration management database, or an asset database), or the information may be discovered specifically for the application using a discovery tool. Such methods may also be combined.

When making a recommendation in block 514, it may be the case that there is no existing cloud which can accommodate all of the workload factors. Alternatively, the cost for using an existing cloud solution may exceed the potential cost for designing and building a private cloud for the workload. In such a case, the design for a new, private cloud may be suggested and at least partially automated.

Figure 6:
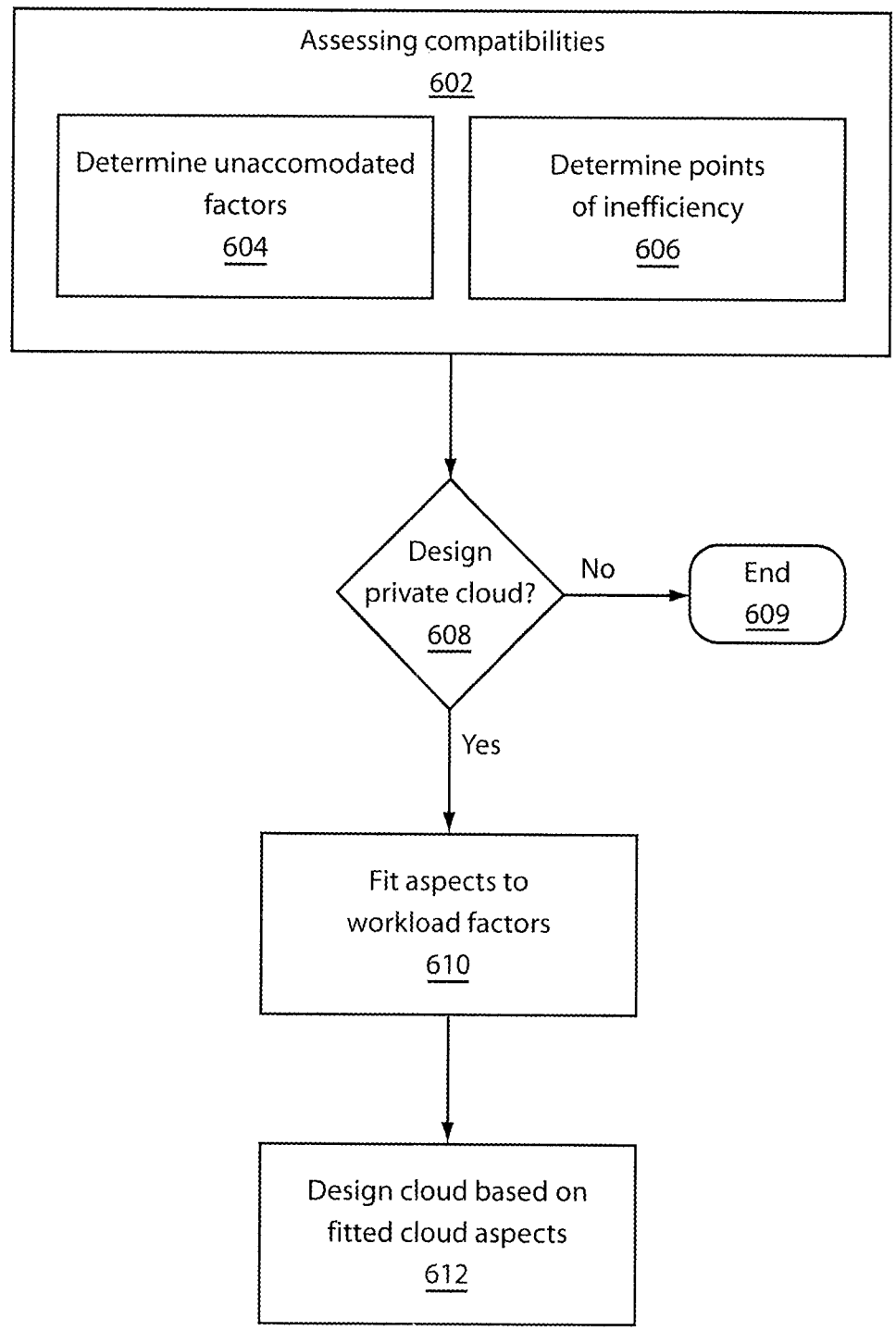
FIG. 6 depicts a block/flow diagram of designing a private cloud according to an embodiment of the present invention.

Referring now to FIG. 6, a block/flow diagram of a method for automatically designing a private cloud. Block 602 assesses the compatibilities of the workload factors 404 with pre-existing clouds 414. This step may be performed as part of block 506. Block 602 includes a determination 604 as to whether there are any workload factors 404 which are not accommodated in any of the pre-existing solutions. Block 602 also includes a determination as to whether points of substantial inefficiency exist (e.g., where a cloud is substantially overpowered for a given workload or provides many more features than the workload needs).

These factors are considered in block 608 in determining whether to design a private cloud. If there is no extant cloud that can accommodate the workload, then designing a private cloud is the only viable option. If the inefficiencies of block 606 are substantial, then the cost of using an existing cloud will outweigh the cost of designing and building a private cloud. In either case, block 608 will continue on to block 610 to determine set of cloud aspects 412 that provide a best fit for the workload factors 404. Otherwise, processing ends. A customer may naturally want to create a private cloud for other reasons, beyond simple efficiency, and decision block 608 also takes these individual considerations into account.

Block 610 performs a fit of cloud aspects 412 to workload factors 404. One exemplary approach to performing this fit is to form a set of cloud aspects that will accommodate all of the workload factors. In an optimization of the choices, in addition to steady-state costs and migration costs, one may include cloud design and implementation cost. Other user-selected criteria may be included. For example, a number of operating systems in the cloud may be selected as a compromise between the steady-state cost of administering multiple operating systems and the migration costs of porting existing servers/images with different operating systems. Another option is to include parameters for variance. For example, a set of images may be defined that include one with 1 GB of memory, one with 2 GB, and one with 4 GB. The images may be designed such that all of the workload's source images fit within one of these images without substantial waste. This can allow room for the workload to grow within the cloud. Block 612 provides concrete design suggestions based on the fitted cloud aspects. The design may include particular hardware, software, non-functional requirements, and process suggestions that will provide all of the aspects needed to run the given workloads or a chosen subset of them.

As an example, consider a banking organization (hereinafter "client") with several non-cloud workloads that is moving toward cloud implementations. The client wants to leverage cloud delivery as a means of removing low-priority applications from the client's data centers. This allows the client to put their local resources to higher-priority applications. Before making the transition, the client wants to demonstrate a reusable framework for analyzing workloads with the potential to be delivered in a cloud. Toward this end, the client wants to know what clouds would be appropriate and wants to review high-level costs associated with the migration to a cloud delivery model. Furthermore, the client wants to know what non-technical considerations are involved in the decision to move to a cloud.

The present techniques may be applied in several ways. First, the present principles may be employed to determine that some workloads are better suited than others for the purpose of migration to a cloud. For example, requiring more RAM than any cloud standard image offers, an incompatible operating system, too high IO bandwidth for a certain virtualized and shared environment, too high availability requirements, or security requirements that exclude certain types of resource sharing may exclude a workload from migration to a certain cloud. By filtering workload factors, a relatively small set of candidate workloads may be generated that will result in the greatest savings in migration. The present principles also allow for determining which particular cloud or cloud technology to employ.

Figure 7:
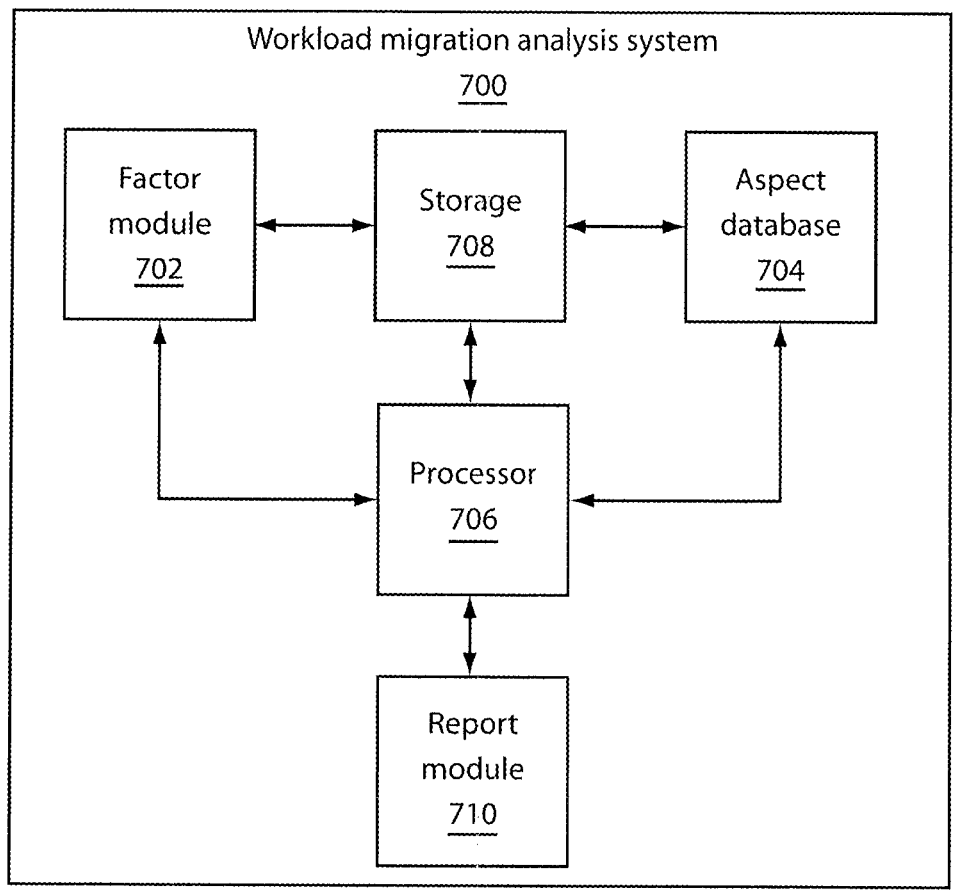
FIG. 7 depicts a block diagram of a workload migration analysis system according to an embodiment of the present invention.

Referring now to FIG. 7, a workload migration analysis system 700 is shown. Factor module 702 provides workload factors 404. The factor module 702 may obtain said factors through manual data entry, by automatic analysis of a workload using a discovery tool, or both. Typically, not all workload factors of interest can be analyzed automatically, such as the security and compliance requirements of the workload, while workload factors like installed software or utilization are more reliably obtained by automatic discovery. Another option is for the customer to extract data related to workload factors from their databases and provide them to the team performing the migration analysis, where typically one of the teams has to convert the data from their original format to the format understood by the migration analysis tool. Discovery tools typically capture both dynamic information (such as running processes and observed connections) and static information (such as registries and software configuration files, sometimes even code analysis) and combine them into meaningful outputs. Aspect database 704 meanwhile provides cloud aspects 412 that characterize existing and potential cloud technologies. Factor module 702 and Aspect database 704 store their respective data in storage 708 and are in communication with processor 706. Processor 706 performs at least factor/aspect fitting and cloud design. Based on the output of processor 706, a report module 710 generates a recommendation, design, and/or plan for workload migration to a cloud. The report module may present its report in the form of a document or as an interactive presentation via a graphical user interface. In particular, the report module will provide information regarding costs and benefits of different migration options.

Figure 8:
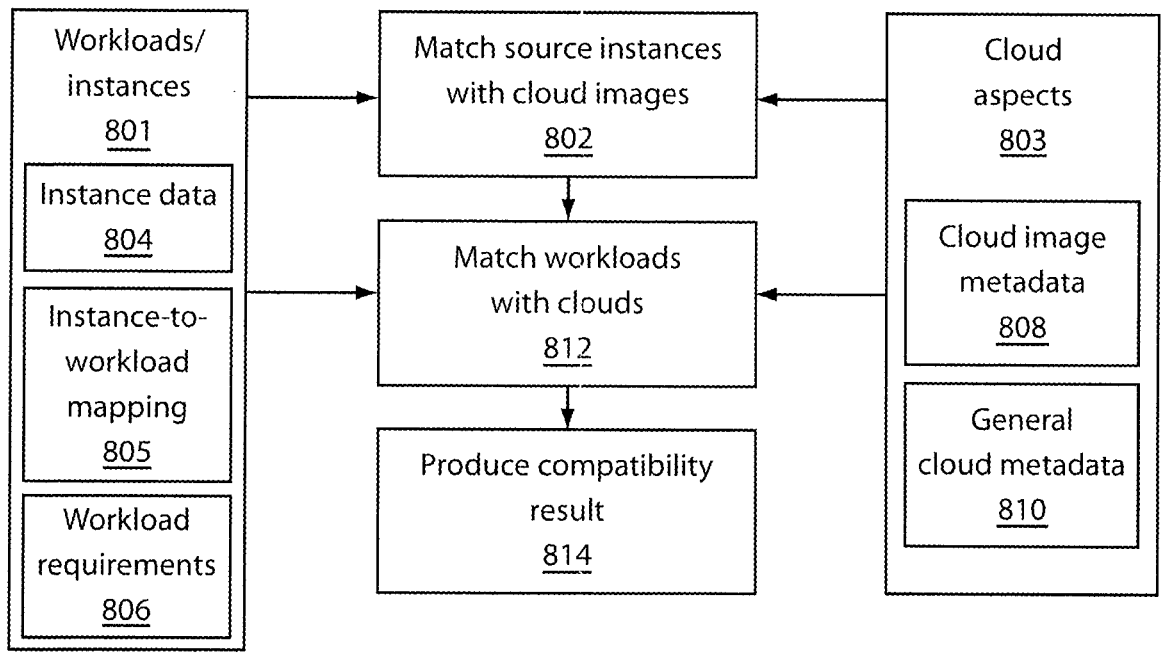
FIG. 8 depicts a block/flow diagram for assessing workload-to-cloud compatibility according to an embodiment of the present invention.

Referring now to FIG. 8, a detailed view of compatibility analysis 406 is shown. Workload/instance information 801 is considered and includes instance data 804, instance-to-workload mappings 805, and workload requirements 806. An instance as used herein refers to a physical or virtual server. Instance data 804 may include the elements described above, including for example data regarding operating systems, software, and utilization. Workload requirements may include the factors described above, including for example SLAs, compliance requirements, and availability requirements. Also considered are cloud aspects 803, which may include cloud image metadata 808 and general cloud metadata 810. An image as used herein refers to a description of a virtual server for easy deployment in a cloud.

Source instances are matched with cloud images at block 802 using instance data 804 and cloud image metadata 808. This yields a table or similar data structure that describes which instances are able to run on which cloud images. Block 812 matches workloads to clouds, using instance-to-workload mappings 805, workload requirements 806, and general cloud metadata 810. In matching workloads to clouds, block 812 checks whether each instance serving a given workload has a matching image in the cloud and whether workload-level requirements are fulfilled. Based on this match, a compatibility result is produced at block 814.

If an instance belongs to several workloads, the workloads may be treated as a single cumulative workload or, alternatively, the instance may be split into multiple instances, each having only the software and data belonging to a single workload. In other cases, the instance may belong primarily to one of the workloads while the other workloads may be migrated independent of it. All three cases are options that may be weighed within the same methods and systems.

Figure 9:
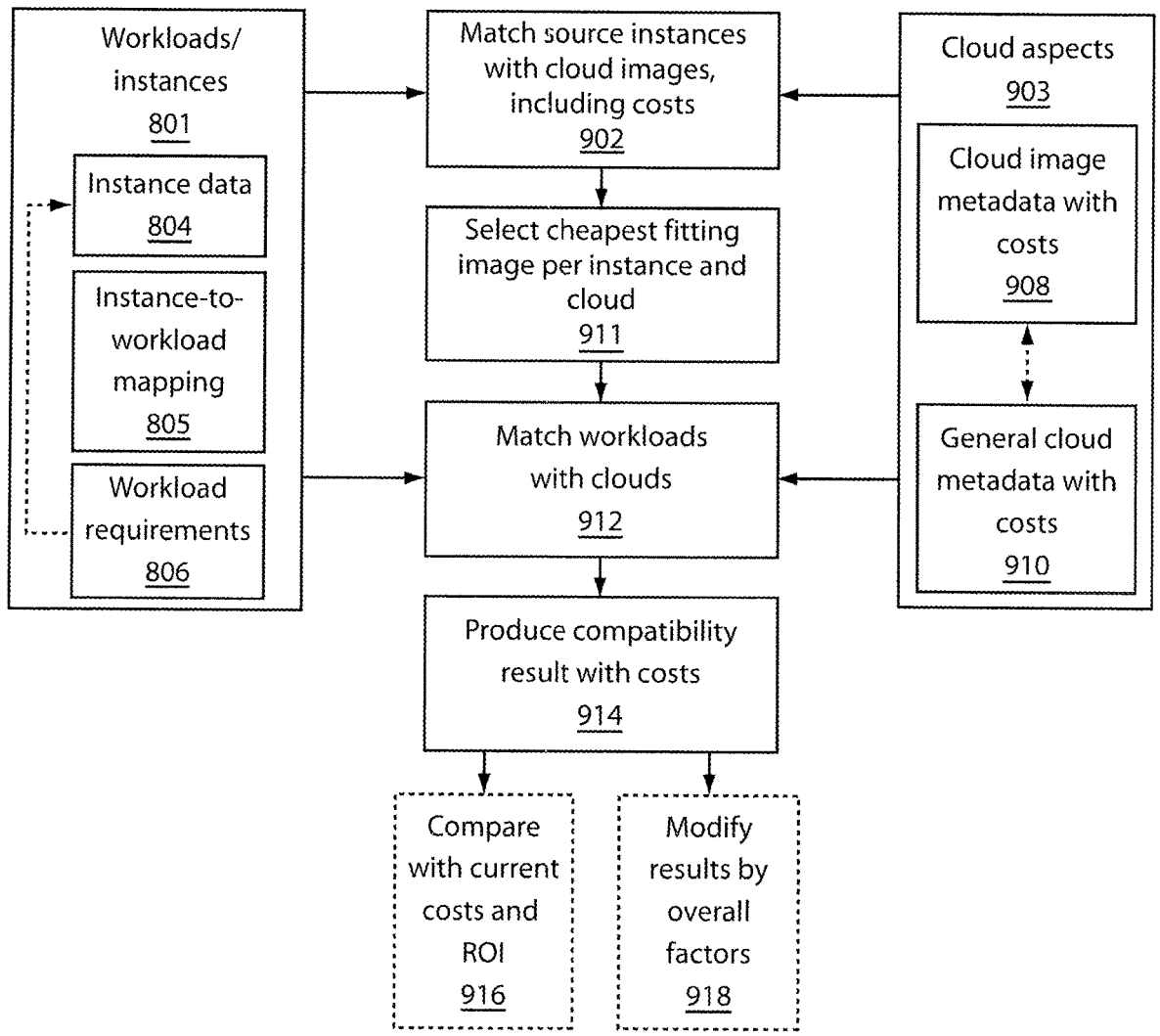
FIG. 9 depicts a block/flow diagram for creating a workload-to-cloud cost recommendation according to an embodiment of the present invention.

Referring now to FIG. 9, an extension of the compatibility analysis is shown that includes cost considerations. In this case, cloud aspects 903 include cost information, with cloud image metadata 908 and general cloud metadata 910 including costs. Using this information, block 902 performs matching between instances and cloud images and includes costs, such as migration and steady-state costs. Some workload requirements may be related to cloud aspects, such that costs are associated with individual images (e.g., a cloud catalogue may include images with various security or availability levels, while security and availability on the source side are workload requirements), and such costs are also considered in the image selection. Information about these costs is shown in FIG. 9 as dashed lines.

Block 911 selects the cheapest cloud image for each cloud under consideration that can accommodate the instance(s). For example, an image with a certain UNIX-style operating system and certain resource needs and utilization data may be run on a "silver" image in one cloud, where the cheaper "bronze" image might be too small and the "gold" image too expensive. Also, if another image is available that accommodates the requirements of the instance but has a different operating system, migration costs will naturally be higher.

Block 912 matches workloads with clouds, again using instance-to-workload mappings 805, workload requirements 806, and general cloud metadata with costs 910. The costs for a workload are dominated by the sum of the costs of the instances serving this workload. Block 914 produces compatibility results along with a breakdown of the associated costs or estimated costs. The compatibility results may include a comparison of current costs and a return-on-investment in block 916 if the current costs of running the instances or workloads are known. In addition, broader considerations may override particular cost considerations, allowing block 918 to modify the results accordingly. For example, one may choose to migrate all workloads to the same cloud for simplicity of governance, even if other clouds would be cheapest per workload.

Figure 10:
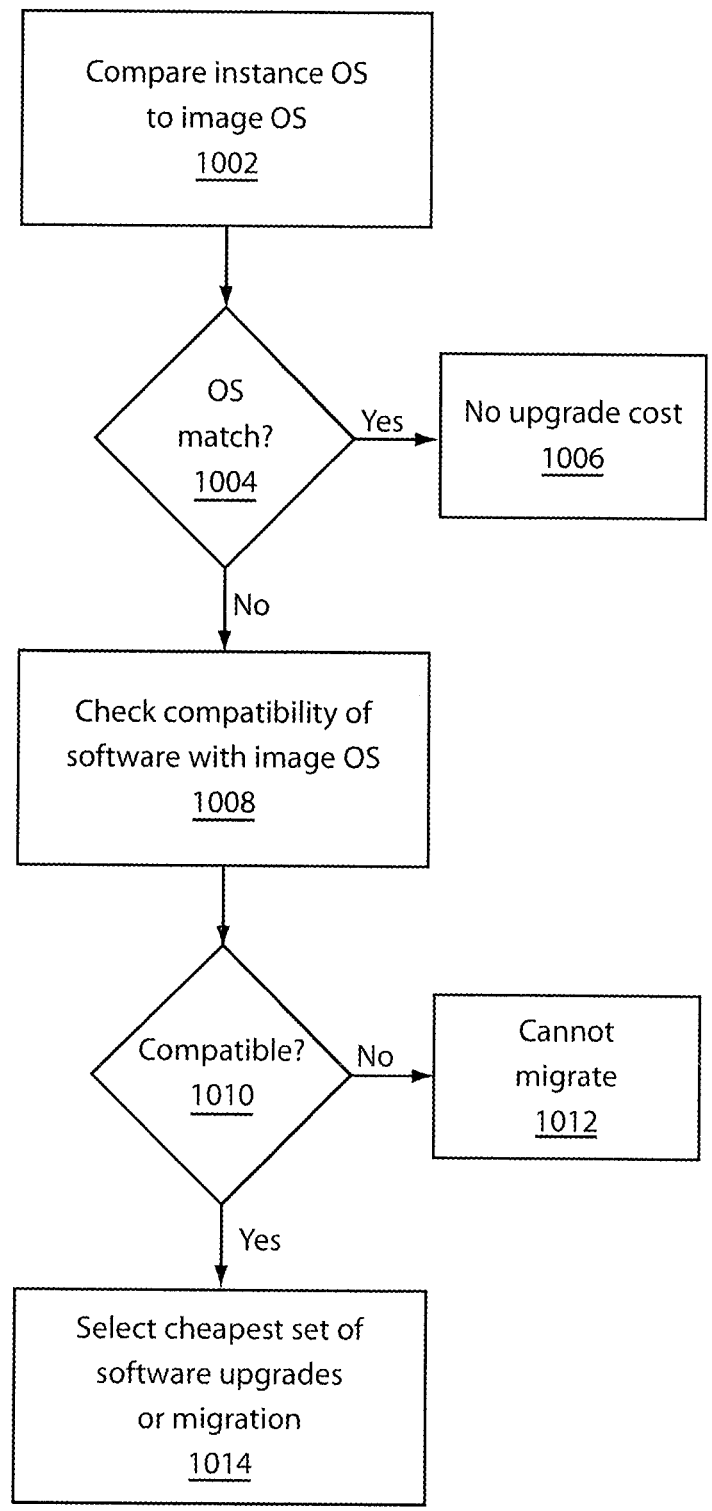
FIG. 10 depicts a block/flow diagram determining operating system and software compatibility according to an embodiment of the present invention.

Referring now to FIG. 10, a detailed view of matching source instances with cloud images is shown in the case of an IaaS cloud where images have only an operating system, and for the specific workload factors and cloud aspects of operating system and software. Such matching includes comparing the operating systems of instances to cloud images at block 1002. Block 1004 determines whether the operating systems match. If so, block 1006 asserts that there is no upgrade cost—because the operating systems match, the instance software will be able to run on the cloud image. If not, block 1008 determines whether the software is compatible with the image OS. This consideration includes determining whether the software may be upgraded or migrated to the image OS and determining or estimating the costs associated with such a change. In the case of PaaS, cloud images would also have software, such that block 1008 would also perform matching of instance software and cloud software. If the software is not compatible, block 1012 asserts as much. If the software is compatible, block 1014 selects the cheapest set of upgrades or software migration. There are intermediate cases between IaaS and PaaS where one can order images with and without software already installed. The minimum compatibility criterion would be as above for IaaS, but migration may be cheaper to images that already have the instance software installed.

TABLE 3

| SW_old | SW_new | Upgrade_cost |
|---|---|---|
| APS5 | APS6 | 100 |
| APS5 | APS7 | 200 |
| FreeAps4 | APS6 | 400 |
| . . . | . . . | . . . |

TABLE 4

| OS | SW | Compatible |
|---|---|---|
| XOS3 | APS5 | No |
| XOS3 | APS6 | Yes |
| XOS3 | APS7 | Yes |
| XOS4 | APS5 | No |
| XOS4 | APS6 | No |
| XOS4 | APS7 | Yes |
| ... | ... | ... |

Tables 3 and 4 above represent exemplary data structures used in matching. Table 3 shows upgrade or migration costs between pairs of software versions, illustrating the cost of upgrading instance software SW_old to image-compatible SW_new. Table 4, meanwhile, shows compatibility of software with operating systems. For example Table 4 shows that version five of an application server APS cannot run on either XOS3 or XOS 4, whereas versions 6 and 7 may be able to. Thus, if a cloud has XOS3 and a source instance has APS 5, the cheapest way to achieve compatibility is to upgrade to APS6. To use an XOS4 image, one would have to upgrade to APS7, because APS6 is not compatible with the newer XOS4.

The selection of block 1014 may be expressed by a rule. For example:

```
Given SW_old (from the instance) and OS (from a cloud image);
select SW_new such that
    Compatible(OS, SW_new)
    and Upgrade_cost(SW_old, SW_new)
        = min(Upgrade_cost(SW_old, SW_new_temp) | Compatible(OS,
        SW_new_temp));
```

In this formula, it may be assumed that Upgrade_cost (SW_old, SW_old)=0 for all software SW_old, even though it is not explicitly stated in the tables above. As shown in box 918 of FIG. 9, there may be additional considerations which influence the final choice. For example, one might decide only to use the newest software everywhere if one has to make upgrades at all, so as to save overall management costs or to save on future upgrades.

Referring now to FIG. 11, an exemplary rule-based system is shown. A series of rules are shown integrated with cloud metadata, describing two clouds 1104 (C1 and C2) and the rules for matching instances to them. C1 has seven images 1102 and C2 has three in this example. The top row lists cloud aspects 1106. The second row lists rules 1108. Each rule refers to a column with the same name in a source instance. For example, source os_name is compared with image os_name, and so on. The second row 1108 gives the actual rule from a documented set of rules. For example, os_name is compared by string comparison "str_=", while mem_GB (the memory in gigabytes) is compared by a "greater or equal" rule, meaning that the cloud image should have at least as much memory as the instance.

The countries column 1110 is an example of a "CONTAINS" rule, meaning that the instance country should be one of the countries listed for the cloud (e.g., "US, Canada, Mexico"). This may indicate that, for performance reasons, it would be disadvantageous to migrate workloads that were on a different continent.

Other cloud aspects, such as HIPAA compliance 1112 and change window 1114 are included, where the corresponding workload factors may be defined on the workload level rather than the instance level. For this simple case, however, the source input may be preprocessed, using instance-to-workload mapping 805, such that all such aspects are listed per image.

TABLE 5

| Workload | Migration (qualitative) | C1 Cost | Source Cost | C1 Cost-Ratio | Source Cost-Ratio |
|---|---|---|---|---|---|
| xyz reporting | 40 | $4,000.00 | $5,000.00 | $4,000.00 | $5,000.00 |
| stu infra-structure | 20 | $500.00 | $1,500.00 | $500.00 | $1,500.00 |
| vwx web | 8 | $200.00 | $400.00 | $200.00 | $400.00 |
| pqr | 104 | $2,000.00 | $4,000.00 | $500.00 | $1,500.00 |
| ... | ... | ... | ... | ... | ... |

Table 5 illustrates a potential compatibility result. The table shows workloads that are compatible with a cloud C1 and displays the related costs. The column C1 Cost shows the costs for running the workload on cloud C1, that being the sum of the costs of the images that would be used for the instances and potential extra costs like independently billed network usage. The Source Cost column describes prior costs for the workloads, if known. Migration costs are only given qualitatively in this case, illustrating a relative difficulty for comparison to other migration difficulties, but not with costs. This is because it may not be possible in all cases to get accurate migration cost predictions. The cost ratio columns are used in case instances are used in several workloads. The cost ratio columns divide the cost for the instances equally among the workloads using it.

Having described preferred embodiments of a system and method for workload-to-cloud migration based on cloud aspects (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method comprising:
    determining one or more computing solution aspects corresponding to one or more sets of workload factors, where the workload factors characterize one or more workloads, to characterize one or more computing solutions;
    comparing the workload factors to the computing solution aspects using a processor in a rule-based system to exclude incompatible computing solutions that cannot satisfy the workload factors and to create a filtered set of computing solutions, the comparing further comprising:
        determining whether operating systems of source images of the one or more workloads match operating systems of one or more target images of available computing solutions of the one or more computing solutions, wherein a cost and capability of migration of the one or more workloads from the operating systems of the source images to the operating systems of the one or more target images is determined if there is no match found; and
    migrating the one or more workloads based on selecting, from the available computing solutions, an available-computing solution having computing solution aspects that accommodate all of the workload factors from the filtered set of computing solutions to accommodate the migrating of the one or more workloads.

2. The method of claim 1, wherein the workload factors include one or more of the following: a utilization function, a current virtualization, an amount of custom code, one or more stakeholders, and a work type.

3. The method of claim 1, wherein the workload factors include one or more of the following: availability, security, compliance, and infrastructure management tooling.

4. The method of claim 1, wherein the computing solution aspects include one or more of the following: operating systems offered, software offered, image resource assignments offered, a middleware standardization, a service level agreement offered, disaster recovery (DR) offered, a security feature, and a platform-as-a-service aspect.

5. The method of claim 1, wherein the rule based system includes one or more rules, and said rules comprise one or more of the following: operating system compatibility, hardware compatibility, resource requirements fulfillment, and availability requirements fulfillment.

6. The method of claim 1, further comprising calculating potential steady-state savings.

7. The method of claim 1, further comprising the calculating migration costs.

8. The method of claim 1, wherein the workload factors comprise per-server factors for the workloads and a workload-to-server mapping, the computing solution aspects comprise image-level factors, and evaluating comprises comparing compatibility of all servers mapped to a workload with images in each computing solution.

9. The method of claim 1, further comprising providing a private computing solution if there is no extant computing solution having aspects which are compatible with all of the workload factors or if a cost of building a private computing solution is lower than a cost of using an extant computing solution.

10. A computer readable storage medium comprising a computer readable program, wherein the computer readable program when executed on a computer causes the computer to perform the steps of claim 1.

11. A method comprising:
determining computing solution aspects using a processor to accommodate a set of workload factors that characterize one or more workloads, to characterize one or more computing solutions;
determining a set of components for a computing solution that provide or exceed the determined computing solution aspects according to a rule based system to exclude incompatible computing solutions that cannot satisfy the workload factors, the determining further comprising:
comparing the set of workload factors to available computing solution aspects to identify the incompatible computing solutions that cannot satisfy the workload factors and to create a filtered set of computing solutions, the comparing further comprising:
determining whether operating systems of source images of the one or more workloads match operating systems of one or more target images of available computing solutions of the one or more computing solutions, wherein a cost and capability of migration of the one or more workloads from the operating systems of the source images to the operating systems of the one or more target images is determined if there is no match found;
selecting components from the determined set of components that optimize cost; and
generating a computing solution design that uses the selected components such that the computing solution is compatible with the one or more workloads; and
migrating the one or more workloads based on selecting, from a set of available compatible computing solutions, an available compatible computing solution having computing solution aspects that accommodate all of the workload factors from the filtered set of computing solutions to accommodate the migrating of the one or more workloads.

12. The method of claim 11, wherein determining computing solution aspects comprises establishing a set of computing solution aspects that accommodates all of the workload factors.

13. The method of claim 11, wherein determining computing solution aspects comprises establishing a set of computing solution aspects that accommodates all of the workload factors plus a variance parameter to provide for workload growth.

14. A computer readable storage medium comprising a computer readable program, wherein the computer readable program when executed on a computer causes the computer to perform the steps of claim 11.

15. A system for evaluating compatibility of a computing solution to perform one or more workload tasks, comprising:
an aspect database configured to determine one or more computing solution aspects corresponding to one or more sets of workload factors, where the workload factors characterize one or more workloads, to characterize one or more computing solutions; and
a processing module configured to compare the workload factors to the computing solution aspects in the aspect database, in a rule-based system, to exclude incompatible computing solutions that cannot satisfy the workload factors and to create a filtered set of computing solutions, the processing module being further configured to determine a computing solution having computing solution aspects that accommodate all of the workload factors to find a computing solution that accommodates the one or more individual workloads, the comparing the one or more sets of workload factors further comprising:
determining whether operating systems of source images of the one or more sets of workload factors match operating systems of one or more target images of available computing solutions of the one or more computing solutions, wherein a cost and capability of migration of the one or more workloads from the operating systems of the source images to the operating systems of the one or more target images is determined if there is no match found; and
migrating the one or more workloads based on selecting, from the available computing solutions, an available computing solution having computing solution aspects that accommodate all of the workload factors from the filtered set of computing solutions to accommodate the migrating of the one or more workloads.

16. The system of claim 15, wherein the workload factors include one or more of the following: a utilization function, a current virtualization, an amount of custom code, one or more stakeholders, and a work type.

17. The system of claim 15, wherein the computing solution aspects include one or more of the following: a virtualization, operating systems offered, software offered, image resource assignments offered, a middleware standardization, a service level agreement offered, data recovery (DR) offered, a security feature, and a platform-as-a-service aspect.

18. The system of claim 15, wherein the rule based system includes one or more rules, and said rules comprise one or more of the following: cost minimization, operating system compatibility, hardware compatibility, resource requirements fulfillment, and availability requirements fulfillment.

19. The system of claim 15, wherein the processing module is further configured to calculate potential steady-state savings.

20. The system of claim 15, wherein the workload factors comprise per-server factors for the workloads and a workload-to-server mapping, the computing solution aspects comprise image-level factors, and evaluating comprises comparing compatibility of all servers mapped to a workload with images in each computing solution.

* * * * *